US010221766B2

(12) United States Patent
Wotzak

(10) Patent No.: US 10,221,766 B2
(45) Date of Patent: Mar. 5, 2019

(54) SUMP ASSEMBLY FOR A GAS TURBINE ENGINE

(71) Applicant: General Electric Company, Schenectady, NY (US)

(72) Inventor: Mark Gregory Wotzak, Chestnut Hill, MA (US)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 15/141,917

(22) Filed: Apr. 29, 2016

(65) Prior Publication Data

US 2017/0314468 A1 Nov. 2, 2017

(51) Int. Cl.
*F02G 3/00* (2006.01)
*F02C 7/06* (2006.01)
*F02C 3/04* (2006.01)
*F01M 11/00* (2006.01)
(Continued)

(52) U.S. Cl.
CPC .............. *F02C 7/06* (2013.01); *F01D 25/125* (2013.01); *F01D 25/183* (2013.01); *F01M 11/0004* (2013.01); *F02C 3/04* (2013.01); F05D 2220/32 (2013.01); F05D 2230/53 (2013.01); F05D 2240/50 (2013.01); F05D 2240/60 (2013.01);
(Continued)

(58) Field of Classification Search
CPC . F01D 25/125; F01D 25/183; F01M 11/0004; F02C 3/04; F02C 7/06; F05D 2220/32; F05D 2230/53; F05D 2240/50; F05D 2240/60; F05D 2260/98; Y02T 50/671; Y02T 50/675
See application file for complete search history.

(56) References Cited

U.S. PATENT DOCUMENTS

| 3,528,241 A | 9/1970 | Venable et al. |
| 4,462,204 A * | 7/1984 | Hull .................. F01D 25/12 |
| | | 415/115 |
| 6,513,335 B2 | 2/2003 | Fukutani |

(Continued)

FOREIGN PATENT DOCUMENTS

| CN | 103109045 A | 5/2013 |
| EP | 2 657 465 A1 | 10/2013 |

OTHER PUBLICATIONS

Extended European Search Report and Opinion issued in connection with corresponding EP Application No. 17167500.2 dated Oct. 18, 2017.

(Continued)

*Primary Examiner* — Jesse Bogue
(74) *Attorney, Agent, or Firm* — General Electric Company; Pamela Kachur

(57) ABSTRACT

The present disclosure is directed to a sump housing for a gas turbine engine. The sump housing includes a base portion and a first wall extending outwardly from the base portion. The first wall and the base portion at least partially define an inner chamber. A second wall is positioned outwardly from the first wall and extends outwardly from the base portion. The base portion, the first wall, and the second wall at least partially define an outer chamber positioned outwardly from the inner chamber. A projection extending inwardly from the first wall engages a bearing assembly. The base portion, the first wall, the second wall, and the projection are integrally coupled together.

18 Claims, 6 Drawing Sheets

(51) Int. Cl.
    *F01D 25/12* (2006.01)
    *F01D 25/18* (2006.01)
(52) U.S. Cl.
    CPC ......... *F05D 2260/98* (2013.01); *Y02T 50/671* (2013.01); *Y02T 50/675* (2013.01)

(56) References Cited

U.S. PATENT DOCUMENTS

| | | | |
|---|---|---|---|
| 6,585,482 | B1 * | 7/2003 | Liotta ................. F02C 3/08 |
| | | | 415/1 |
| 6,748,741 | B2 | 6/2004 | Martin et al. |
| 7,093,418 | B2 * | 8/2006 | Morris ............... F01D 25/125 |
| | | | 184/6.11 |
| 7,753,172 | B2 | 7/2010 | Munson |
| 7,878,303 | B2 | 2/2011 | Munson |
| 8,231,341 | B2 | 7/2012 | Anderson et al. |
| 2003/0110778 | A1 | 6/2003 | Karafillis et al. |
| 2012/0247572 | A1 | 10/2012 | Joseph |
| 2014/0182292 | A1 | 7/2014 | Hudon et al. |
| 2015/0060042 | A1 | 3/2015 | Shilpiekandula et al. |
| 2015/0267812 | A1 | 9/2015 | Hinton et al. |
| 2015/0300266 | A1 * | 10/2015 | Glahn ................. F01D 11/04 |
| | | | 60/785 |
| 2017/0030220 | A1 * | 2/2017 | Miller ................. F01D 25/164 |
| 2018/0135517 | A1 * | 5/2018 | Mook ................. F02C 3/14 |

OTHER PUBLICATIONS

Machine Translation and First Office action and search issued in connection with corresponding CN Application No. 201710293892.2 dated Sep. 19, 2018.

* cited by examiner

SUMP ASSEMBLY FOR A GAS TURBINE ENGINE

FIELD OF THE INVENTION

The present disclosure relates generally to a gas turbine engine and, more particularly, to a sump assembly for a gas turbine engine.

BACKGROUND OF THE INVENTION

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

Typically, the combustion section includes one or more combustors. Each combustor generally includes a combustion chamber. Compressed air from the compressor section flows into the combustion chamber of each of the one or more combustor and mixes with fuel. The compressed air and fuel mixture is ignited and burns in each combustion chamber, thereby forming combustion gases. The combustion gases, in turn, flow out of each combustion chamber and into the turbine section.

Certain gas turbine engines (e.g., turboprop engines typically used on business and general aviation airplanes) may include one or more reverse flow combustors. Typically, reverse flow combustors direct the air flowing therethrough (i.e., the compressed air, the compressed air and fuel mixture, and the combustion gases) in an S-shaped flow path. In this respect, reverse flow combustors generally have a shorter axial length than other comparable combustors. This, in turn, reduces the overall length of the gas turbine engine, which also reduces the weight thereof. Nevertheless, the configuration of conventional sump assemblies positioned proximate to the reverse flow combustor may limit the axial length reduction associated with using a reverse flow combustor in the gas turbine.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a sump housing for a gas turbine engine. The sump housing includes a base portion and a first wall extending outwardly from the base portion. The first wall and the base portion at least partially define an inner chamber. A second wall is positioned outwardly from the first wall and extends outwardly from the base portion. The base portion, the first wall, and the second wall at least partially define an outer chamber positioned outwardly from the inner chamber. A projection extending inwardly from the first wall engages a bearing assembly. The base portion, the first wall, the second wall, and the projection are integrally coupled together.

A further aspect of the present disclosure is directed to a gas turbine engine. The gas turbine engine includes a compressor, a combustion section, a turbine, and a shaft drivingly coupling the compressor and the turbine. A bearing assembly rotatably supports the shaft, a sump assembly encloses the bearing assembly. The sump includes a main housing having base portion, a first wall, a second wall positioned outwardly from the first wall, and a projection extending inwardly from the first wall that engages the bearing assembly. A front housing includes a front housing projection and a front housing wall. A first seal is positioned between the front housing wall and the shaft. A second seal is positioned between the front housing projection and the shaft. A third seal is positioned between the first wall of the main housing and the shaft. A fourth seal is positioned between the second wall of the main housing and the shaft. The base portion of the main housing, the first wall of the main housing, the front housing, the shaft, the second seal, and the third seal collectively define an inner chamber. The front housing, the shaft, the first seal, and the second seal collectively define a first outer chamber. The base of the main housing, the first wall of the main housing, the second wall of the main housing, the shaft, the third seal, and the fourth seal collectively define a second outer chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
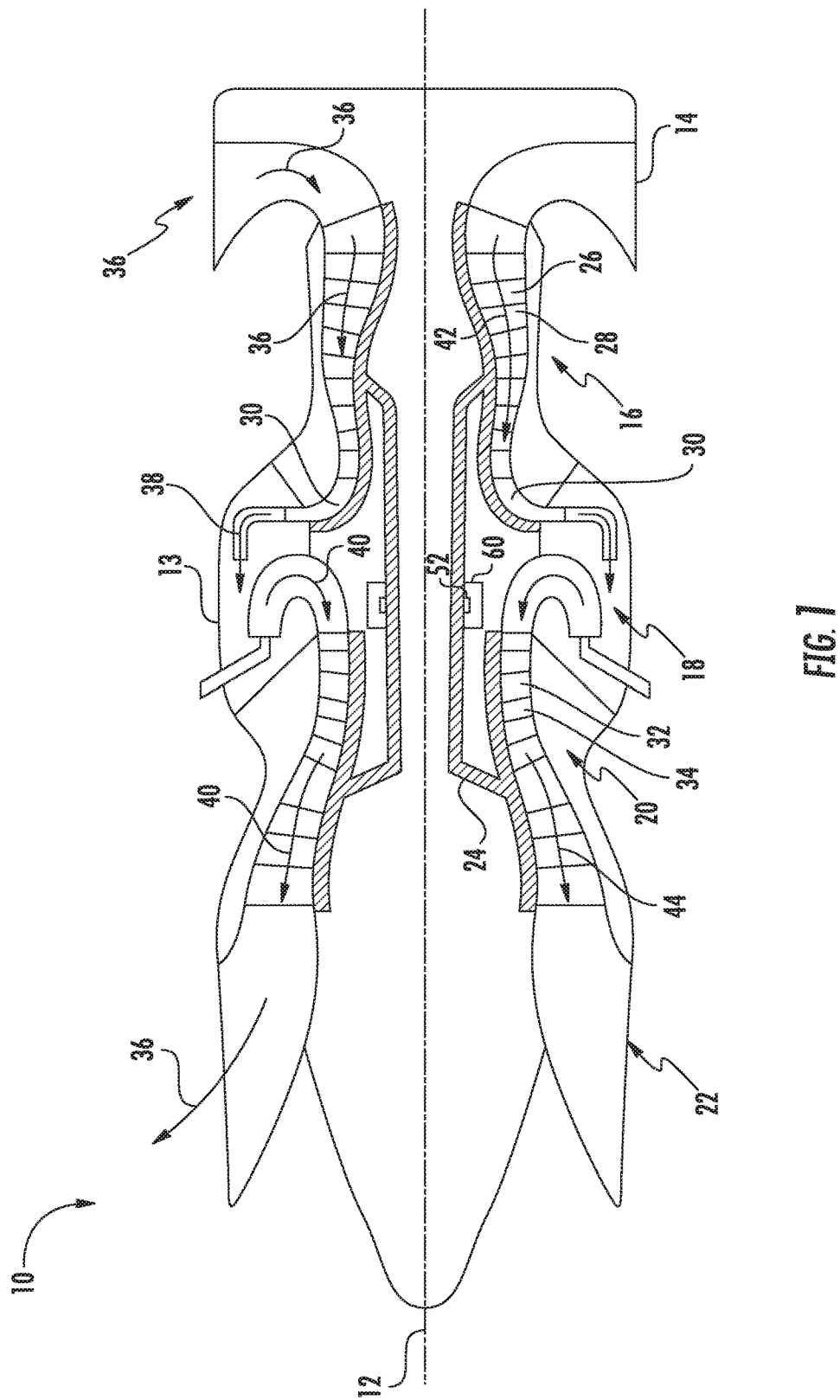
FIG. 1 is a schematic cross-sectional view of an exemplary gas turbine engine in accordance with the embodiments disclosed herein.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of an exemplary gas turbine engine 10 as may incorporate various embodiments disclosed herein. As shown in FIG. 1, the gas turbine engine 10 defines a longitudinal or axial centerline axis 12 extending therethrough for reference.

The gas turbine engine 10 may generally include a substantially tubular outer casing 13 that defines an annular inlet 14. The outer casing 13 may be formed from a single casing or multiple casings. The outer casing 13 encloses, in serial flow relationship, a compressor 16, a combustion section 18, a turbine 20, and an exhaust section 22. The compressor 16 includes one or more sequential stages of compressor stator vanes 26, one or more sequential stages of compressor blades 28, and an impeller 30, which define a compressed gas path 42. The turbine 20 includes one or more sequential stages of turbine stator vanes 32 and one or more sequential stages of turbine blades 34, which define a hot gas path 44. A shaft or spool 24 drivingly couples the turbine 20 and the compressor 16. The shaft 24 may be formed from a single shaft or multiple shaft segments. A bearing assembly 52 is positioned in a sump assembly 60 to rotatably support the shaft 24. The gas turbine engine 10 may have more bearing assemblies 52 and/or sumps 60 as is needed or desired.

Although not shown, the gas turbine engine 10 may include multiple compressors and/or multiple turbines. In some embodiments, for example, the gas turbine engine 10 may include a high pressure compressor (not shown) coupled to a high pressure turbine (not shown) by a high pressure shaft (not shown) and a low pressure compressor (not shown) coupled to a low pressure turbine (not shown) by a low pressure shaft (not shown).

Air 36 enters the inlet portion 14 of the gas turbine engine 10 during operation thereof. The air 36 flows into the compressor 16 where the one or more sequential stages of compressor stator vanes 26 and compressor blades 28 coupled to the shaft 24 progressively compress the air 36 flowing along the compressed gas path 42 to form compressed air 38. The impeller 30 directs the compressed air 38 into the combustion section 18 where it mixes with fuel and burns to provide combustion gases 40. The combustion gases 40 flow along the hot gas path 44 in the turbine 20 where the one or more sequential stages of turbine stator vanes 32 and turbine blades 34 coupled to the shaft 24 extract kinetic and/or thermal energy therefrom. This energy extraction supports operation of the compressor 16. The combustion gases 40 then exit the gas turbine engine 10 through the exhaust section 22 thereof.

Although the gas turbine engine 10 described above is a turbojet engine or turboprop engine for use in an aircraft or helicopter, the gas turbine engine 10 may be any suitable type of gas turbine or be used in any suitable application. For example, the gas turbine engine 10 may by a high bypass turbofan, an unducted turbofan, or an industrial gas turbine used for electricity generation.

Figure 2:
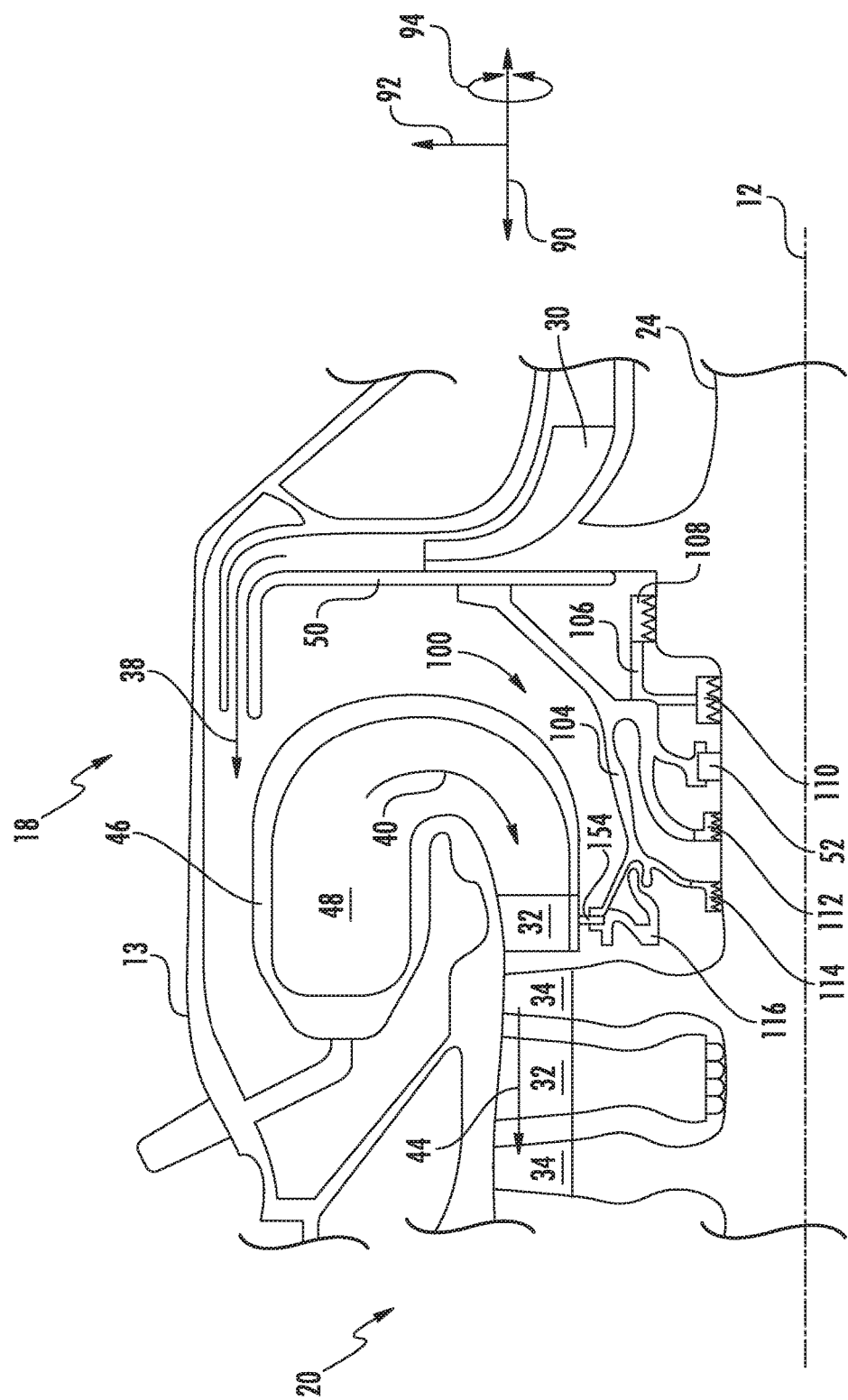
FIG. 2 is a cross-sectional view of a combustion portion of the gas turbine engine shown in FIG. 1, illustrating a sump assembly that included a main housing.

FIG. 2 illustrates the combustion section 18 in greater detail. In particular, the embodiment of the combustion section 18 shown in FIG. 2 includes one or more reverse-flow combustors 46, each of which define a combustion chamber 48. The compressed air 38 mixes with fuel and burns in the combustion chamber 48 to produce the combustion gases 40. The reverse flow combustor 46 directs the air flow therethrough in a generally S-shaped flow path. More specifically, the compressed air 38 enters the combustion section 18 flowing downstream in the axial direction 90. The compressed air 38 then reverses direction and flows upstream in the axial direction 90 into each of the combustion chambers 48. The combustion gases 40 exiting the combustion chamber reverse direction again and flow downstream in the axial direction 90 into the turbine 20. In alternate embodiments, however, the combustion section 18 may include any suitable type of combustor (e.g., can-annular, etc.).

Figure 3:
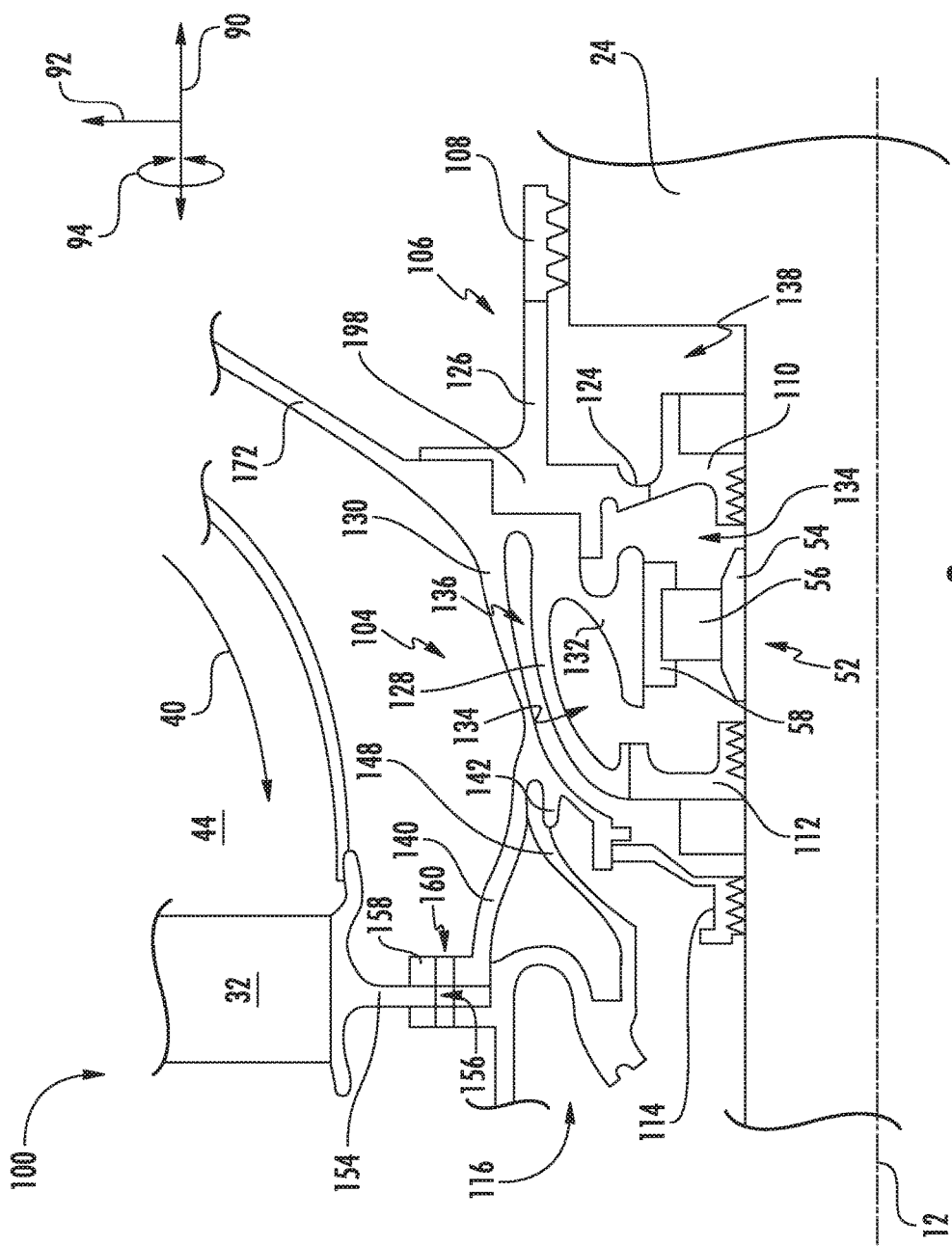
FIG. 3 is an enlarged cross-sectional view of the sump assembly shown in FIG. 2, illustrating various components and features of the sump assembly.

As mentioned above, a bearing assembly 52 rotatably supports the shaft 24. FIG. 3 illustrates the bearing assembly 52 permits relative rotational movement between the shaft 24 and the sump assembly 60. In this respect, the bearing assembly 52 includes an inner race 54 and an outer race 58. A rolling element 56 is positioned between the inner and the outer races 54, 58. The bearing assembly 52 may be a ball bearing, a roller bearing, a thrust bearing, or any other suitable type of bearing.

Figure 4:
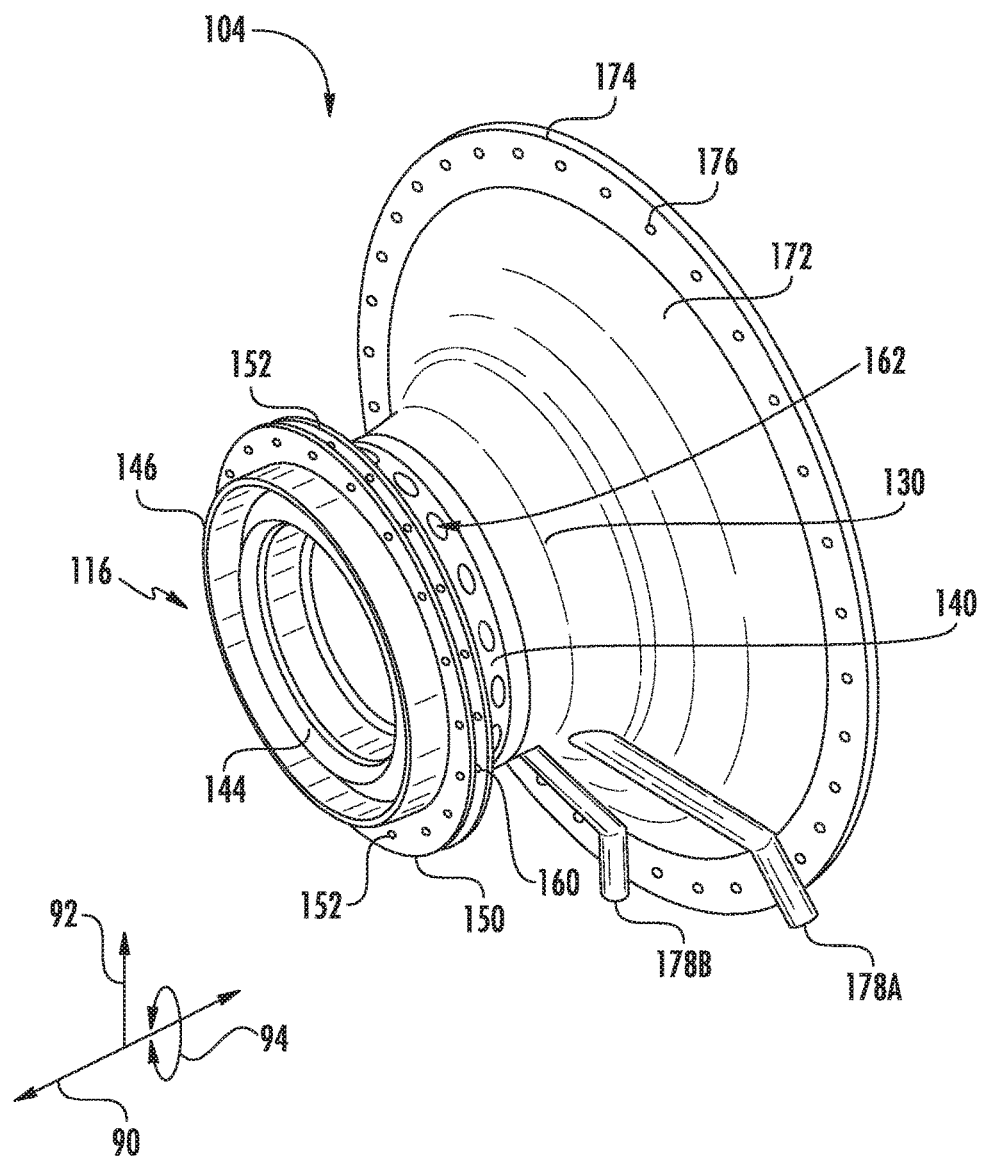
FIG. 4 is a perspective view of the sump assembly shown in FIGS. 2-3, further illustrating the various components and features thereof.

FIGS. 2-4 illustrate the various components of one embodiment of the sump assembly 100, which may correspond with or be installed in place of any of the sump assembly 60. As depicted therein, the sump assembly 100 defines an axial direction 90, a radial direction 92, and a circumferential direction 94. In general, the axial direction 90 extends parallel to the longitudinal axis 12, the radial direction 92 extends orthogonally outwardly from the longitudinal axis 12, and the circumferential direction 94 extends concentrically around the longitudinal axis 12.

The sump assembly 100 includes a front housing 106, a main housing 104, a first seal 108, a second seal 110 positioned downstream of the first seal 108, a third seal 112 positioned downstream of the second seal 110, and a fourth seal 114 positioned downstream of the third seal 112. The sump assembly 100 encloses the bearing assembly 52. In the embodiment shown in FIG. 3, the first and the fourth seals 108, 114 are labyrinth seals, and the second and the third seals 110, 112 are hydrodynamic seals. Nevertheless, the first, the second, the third, and the fourth seals 108, 110, 112, 114 may be any suitable type of seal (e.g., labyrinth, carbon, hydrodynamic carbon, finger, etc.) or combination thereof. The sump assembly 100 may include additional seals (not shown) as well.

FIG. 2 illustrates the positioning of one embodiment of a sump assembly 100 within the gas turbine engine 10. As shown in FIG. 2, the sump assembly 100 is positioned in the combustion section 18 proximate to the reverse flow combustor 46. More specifically, the sump assembly 100 circumferentially encloses a portion of the shaft 24. In this respect, the sump assembly 100 is positioned entirely radially outwardly from the portion of the shaft 24 enclosed thereby. Since the shaft 24 may have a varying diameter, portions of the shaft 24 not enclosed by the sump assembly 100 may be positioned entirely or partially radially outwardly thereof. In the embodiment shown in FIG. 2, a portion of the sump assembly 100 is positioned between the reverse flow combustor 46 and the shaft 24. That is, a portion of the sump assembly 100 is positioned radially inwardly from and axially aligned with a portion of the reverse flow combustor 46. Other portions of the sump assembly 100 are positioned axially upstream and are radially aligned with portions of the reverse flow combustor 46 in the embodiment shown in FIG. 2. Nevertheless, the sump assembly 100 may be positioned in any suitable location and/or orientation in the combustion section 18. The sump assembly 100 may be used in combustion sections having axial flow combustors (not shown) as well. Furthermore, the sump assembly 100 may be located in the compressor 16, the turbine 20, and/or any other suitable location in the gas turbine engine 10 in addition to or in lieu of the combustion section 18. In fact, multiple sump assemblies 100 may be positioned at suitable locations in the gas turbine engine 10 in some embodiments.

FIG. 3 illustrates one embodiment of the front housing 106. In particular, the front housing 106 includes a front housing base portion 198 that mates to the main housing 104. A front housing projection 124 extends radially inwardly from the front housing base portion 198 and mates with the second seal 110. A front housing wall 126 extends axially outwardly in the upstream direction from the front housing base portion 198 and mates with the first seal 108. In this respect, the front housing base portion 198, the front housing wall 126, the first seal 108, the shaft 24, the second seal 110, and the front housing projection 124 define a first outer chamber 138. The front housing base portion 198, the front housing projection 124, and the front housing arm 126 are preferably integrally formed. Although, the front housing base portion 198, the front housing projection 124, and the front housing wall 126 may be separate components coupled together (e.g., via welding, etc.). The front housing 106 may have other configurations as well.

Figure 5:
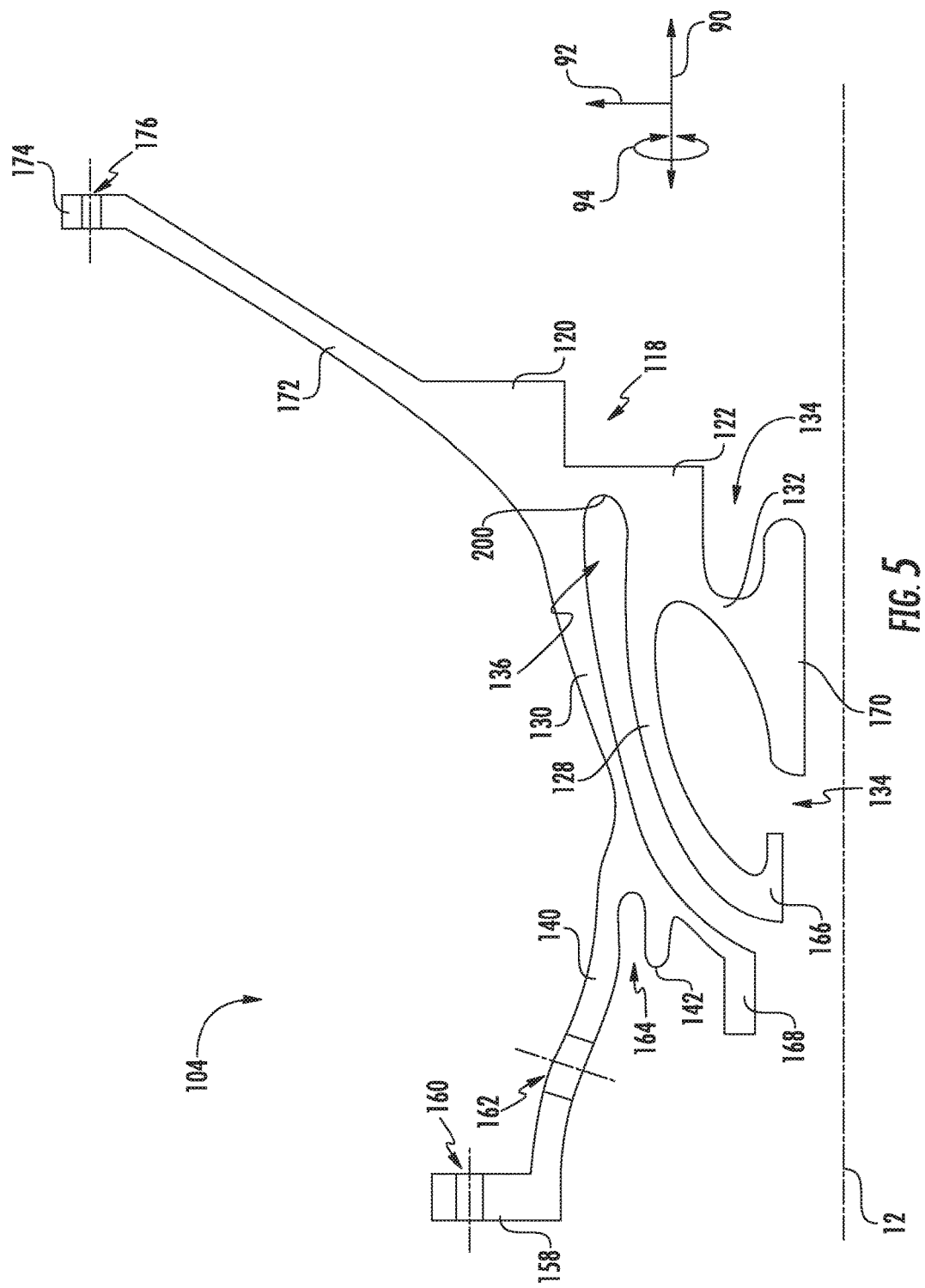
FIG. 5 is a cross-sectional view of the main housing in accordance with the embodiments disclosed herein.

FIGS. 3-5 illustrate the various features of the main housing 104 in greater detail.

Referring now particularly to FIGS. 3 and 5, the main housing 104 includes a main housing base 118, which mates with the front housing base 198. In the embodiment shown in FIGS. 3 and 5, the main housing base 118 includes an outer base portion 120 and an inner base portion 122 coupled by a connecting wall 200. As such, the outer and inner base portions 120, 122 are radially spaced apart by the connecting wall 200. The connecting wall 200 couples an axially downstream end of the outer base portion 120 to an axially upstream end of the inner base portion 122. In this respect, a portion of the outer base portion 120 is positioned axially upstream from the inner base portion 122. As such, the main house base 118 may have a step-like configuration as shown in FIGS. 3 and 5. Nevertheless, the main housing base 118 may have other configurations and/or shapes as well.

The main housing 104 includes a first wall 128. More specifically, the first wall 128 extends axially outwardly in the downstream direction from the inner base portion 122 to a first wall mounting flange 166. In the embodiment shown in FIGS. 3 and 5, the first wall 128 of the main housing 104 extends radially inwardly from the inner base portion 122 to a first wall mounting flange 166. In this respect, the first wall 128 has an arcuate cross-sectional shape in the embodiment shown in FIGS. 3 and 5. Nevertheless, the first wall 128 may have any suitable cross-sectional shape. The first wall mounting flange 166 mates with the third seal 112.

The first wall 128 of the main housing 104 partially defines an inner chamber 134 in which the bearing assembly 52 is positioned. Specifically, the first wall 128 of the main housing 104 in combination with the inner base portion 122 of the main housing 104, the front housing base 198, the front housing projection 124, second seal 110, the shaft 24, and the third seal 112 collectively define the inner chamber 134.

The main housing 104 also includes a second wall 130. In particular, the second wall 130 extends axially outwardly in the downstream direction from the outer base portion 120 to a second wall mounting flange 168. In the embodiment shown in FIGS. 3 and 5, the second wall 130 of the main housing 104 extends radially inwardly from the outer base portion 120 to the second wall mounting flange 168. In this respect, the second wall 130 has an arcuate cross-sectional shape in the embodiment shown in FIGS. 3 and 5. Nevertheless, the second wall 130 may have any suitable cross-sectional shape. The second wall mounting flange 168 is positioned axially space apart from and positioned axially downstream of the first wall mounting flange 166 in the embodiment shown in FIG. 5. The second wall mounting flange 168 mates with the fourth seal 114.

The second wall 130 is spaced apart from and positioned outwardly from the first wall 128. As shown in FIGS. 3 and 5, each position along the axial length of the second wall 130 is radially outward from and radially spaced apart from each corresponding position along the axial length of the first wall 128. That is, every position on the second wall 130 is located radially outward from any position on the first wall 128 that is axially aligned therewith. In this respect, some portions of the first wall 128 (e.g., the axially upstream portions) may be positioned radially outwardly of some portions of the second wall 130 (e.g., the axially downstream portions). Nevertheless, the second wall 130 may be positioned entirely radially outwardly from the first wall 128 in other embodiments.

The second wall 130 of the main housing 104 partially defines a second outer chamber 136. Specifically, the second wall 130 of the main housing 104 in combination with the connecting wall 200 of the main housing 104, the outer base portion 120 of the main housing 104, the front housing base 198, the front housing projection 124, the third seal 112, the shaft 24, and the fourth seal 114 collectively define the second outer chamber 136. The outer chamber 136 may extend circumferentially along a portion of the shaft 24 or the entirety of the shaft 24.

A first projection 132 extends inwardly from the second base portion 204 to mate with the outer race 58 of the bearing assembly 52. In the embodiment shown in FIGS. 3 and 5, the first projection 132 extends radially inwardly and axially outwardly from an axially downstream end of the inner base portion 122. In this respect, the first projection 142 is positioned in the inner chamber 134. Nevertheless, the first projection 132 may extend radially inwardly and axially outwardly from any part of the inner base portion 122 in some embodiments. Furthermore, the first projection 132 may only extend radially inwardly (i.e., orthogonal to the axial centerline 12) in alternate embodiments. The first projection 132 may define one or more apertures (not shown) extending therethrough to permit fluid communication between the portions of the inner chamber 134 positioned forward and aft of the bearing assembly 52. The first projection 132 includes a mounting flange 170 that mates with the outer race 58 of the bearing assembly 52 in the embodiment shown in FIGS. 3 and 5.

A third wall 140 extends outwardly from the second wall 130 to mate with a stator vane extension 154 of the first (i.e., most axially upstream) stator vane 32 in the turbine 20. In the embodiment shown in FIGS. 3 and 5, the third wall 140 extends axially and radially outwardly from the second wall 130. Nevertheless, the third wall 140 may only extend axially outwardly (i.e., parallel to the axial centerline 12) in alternate embodiments. As best illustrated in FIG. 4, some embodiments of the third wall 140 may include a plurality of third wall apertures 162 extending therethrough. An accelerator 116 draws a portion of the compressed air 38 through the plurality of third wall apertures 162 for use in cooling the turbine 20. In the embodiment shown in FIGS. 3 and 5, the third wall 140 includes a mounting flange 158 that extends radially outwardly therefrom for mating with the stator vane extension 154. In this respect, the mounting flange 158 may define one or more mounting flange apertures 160 that receive fasteners (not shown) to couple the third wall 140 to the stator vane extension 154.

A second projection 142 extends outwardly from the second wall 130. In the embodiment shown in FIGS. 3 and 5, the second projection 142 extends axially outwardly from a position on the second wall 130 between the third wall 140 and the second wall flange 168. The second projection 142 may extend angularly (i.e., radially and axially) outwardly from the second wall 130 as well. In this respect, the second wall 130, the third wall 140, and the second projection 142 collectively define a slot 164 that receives a wall 148 of the accelerator 116. In the embodiment shown in FIGS. 3 and 5, the third wall 140 is substantially longer (e.g., five time longer, ten times longer, etc.) in the axial direction 90 that the second projection 142. Nevertheless, the second projection 142 may have any length.

A fourth wall 172 extends outwardly from the main housing base 118 to mate with a combustor frame 50 (FIG. 2) in the combustion section 18. In the embodiment shown in FIG. 5, the fourth wall 172 extends axially and radially outwardly from a radially outer portion of the outer base portion 120. As such, the fourth wall 172 circumferentially encloses a portion of the front housing 106 as shown in FIG. 3. Nevertheless, the fourth wall 172 may extend only radially outwardly (i.e., orthogonal to the axial centerline 12) or only axially outwardly (i.e., parallel to the axial centerline 12) in alternate embodiments. In the embodiment shown in FIG. 5, the fourth wall 172 includes a mounting flange 174 that extends radially outwardly therefrom for mating with the combustor frame 50. In this respect, the mounting flange 174 may define one or more mounting flange apertures 176 that receive fasteners (not shown) to couple the fourth wall 172 to the combustor frame 50.

In some embodiments, the main housing 104 may include one or more tubes 178 to supply and/or remove lubricant and air from the sump assembly 100. In particular, the tubes 178 extend outwardly from and are integrally coupled to the second wall 130. Each of the one or more tubes 178 is in fluid communication with the inner chamber 134. In the embodiment shown in FIG. 4, the main housing 104 includes a supply tube 178A for supplying lubricant to the inner chamber 134 and a scavenge tube 178B for removing lubricant from the inner chamber 134. The supply and the scavenge tubes 178A, 178B extend outwardly along the radially outer surface of the fourth wall 172 in the embodiment shown in FIG. 4. Nevertheless, the supply and the scavenge tubes 178A, 178B may have any suitable orientation or configuration. The one or more tubes 178 may also have any suitable cross-sectional shape (e.g., circular, etc.). In alternate embodiments, the main housing 104 may include more or less tubes 178. For example, the main housing 104 may include a vent tube (not shown) to vent the inner chamber in addition to or lieu of the supply and the scavenge tubes 178A, 178B. Furthermore, the main housing 104 may include an air inlet tube (not shown) and an air outlet tube (not shown) in addition to or in lieu of the supply and the scavenge tubes 178A, 178B to respectively supply and remove air from the second outer chamber 136. In some embodiments, however, the main housing may not include any tubes 178.

The main housing 104 is integrally formed. That is, the main housing base 118, the first wall 128, the second wall 130, the third wall 140, the fourth wall 172, the first projection 132, the second projection 142, the tubes 178A, 178B, and the flanges 158, 166, 168, 170, 174 are all integrally formed together. In this respect, the main housing 104 is preferably formed via additive manufacturing, which is discussed in greater detail below. Nevertheless, the main housing 104 may be formed via any suitable manufacturing process (e.g., casting, machining, etc.).

The term "additive manufacturing" as used herein refers to any process which results in a useful, three-dimensional object and includes a step of sequentially forming the shape of the object one layer at a time. Additive manufacturing processes include three-dimensional printing (3DP) processes, laser-net-shape manufacturing, direct metal laser sintering (DMLS), direct metal laser melting (DMLM), plasma transferred arc, freeform fabrication, etc. A particular type of additive manufacturing process uses an energy beam, for example, an electron beam or electromagnetic radiation such as a laser beam, to sinter or melt a powder material. Additive manufacturing processes typically employ metal powder materials or wire as a raw material.

In operation, the sump assembly 100 provides lubricant to the bearing assembly 52. As discussed in greater detail above, the bearing assembly 52 is positioned in the inner chamber 134, which contains lubricant (e.g., oil, etc.) for lubricating the bearing assembly 52. The first outer chamber 138 and the second outer chamber 136 are filled with air (e.g., a portion of the compressed air 38). The air in the first and the second outer chambers 138, 136 is under greater pressure than the lubricant in the inner chamber 134. In this respect, the greater air pressure in the first and the second outer chambers 138, 136 prevents the lubricant from escaping the inner chamber 134 through the second and the third seals 110, 112. The first and the fourth seals 108, 114 reduce the amount of air in the first and the second outer chambers 138, 136 that escapes therefrom. In this respect, the first and the fourth seals 108, 114 aid in maintaining the air pressure in the first and the second outer chambers 138, 136 above the pressure of the lubricant in the inner chamber 134. Accordingly, the sump assembly 100 is a buffered sump. In some embodiments, air leaking past the first seal 108 may be used to cool portions of the gas turbine engine 10.

Figure 6:
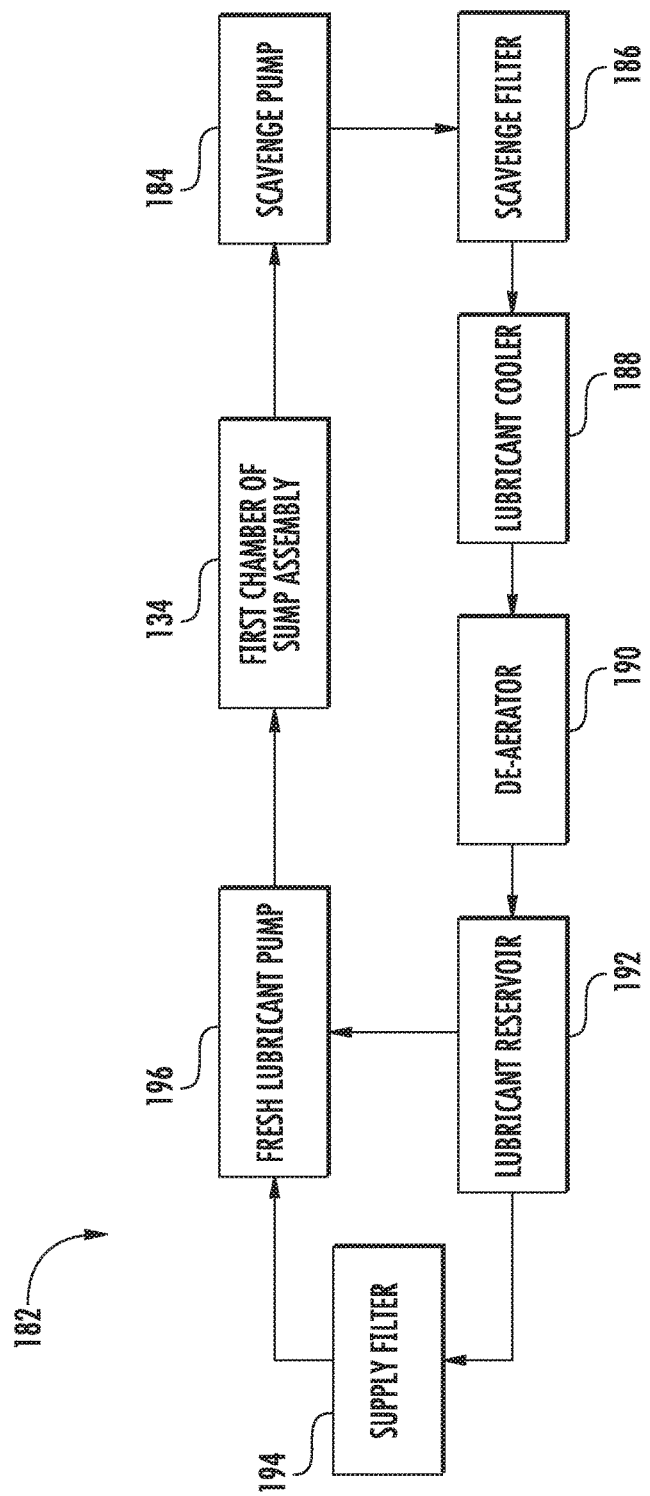
FIG. 6 is a schematic view of one embodiment of a lubricant circulation system that may be incorporated into the gas turbine engine.

FIG. 6 is a schematic view of one embodiment of an optional lubricant circulation system 182 for circulating lubricant into and out of the inner chamber 134 of the sump assembly 100. Some of the air the first and/or the second outer chambers 138, 136 may flow past the second and/or third seals 110, 112 into the inner chamber 134. As such, this air should be removed from the lubricant in the first chamber 134 to maintain proper lubricant properties. In this respect, the lubricant circulation system 182 may include a scavenge pump 184 that pumps air-entrained lubricant from first chamber 134 though, e.g., the scavenge tube 178B, to a lubricant reservoir 192. Before reaching the reservoir 192, the lubricant may pass through a scavenge filter 186 to remove any impurities or contaminants therein. A lubricant cooler 188 may cool the lubricant, which may have been heated due to friction from the bearing assembly 52. A de-aerator 190 removes air entrained in the lubricant prior to storage in the reservoir 192. A fresh lubricant pump 196 may pump lubricant from the lubricant reservoir 192 though, e.g., the supply tube 178A, to the inner chamber 134 as needed to replace lubricant pumped from the inner chamber 134 by the scavenge pump 184. The lubricant may optionally pass through a supply filter 194 before entering the inner chamber 134.

As mentioned above, the sump assembly 100 includes the main housing 104, the front housing 106, the first seal 108, the second seal 110, the third seal 112, and the fourth seal 114. The configuration and features of the main housing 104 described in greater detail above reduce the overall axial length of the sump assembly 100 compared to conventional sump assemblies. As such, the sump assembly 100 does not limit the reduction in axial length of the gas turbine engine 10 associated with using the one or more reverse flow combustors 46 like conventional sump assemblies do. Furthermore, the sump assembly 100 may reduce the axial length of the gas turbine engines having axial flow combustors as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A sump housing for a gas turbine engine, wherein the gas turbine engine defines an axial centerline axis around which the sump housing is defined, wherein a radial direction, an axial direction, and a circumferential direction are each defined relative to the axial centerline axis, the sump housing comprising:
   a base portion comprising an outer base portion radially spaced apart from an inner base portion coupled together via a connecting wall;
   a first wall extending axially outward from the inner base portion, the first wall and the inner base portion at least partially defining an inner chamber;
   a second wall positioned radially outward from the first wall and extending axially outward and radially inward from the outer base portion, wherein the outer base portion, the first wall, and the second wall at least partially define an outer chamber axially and radially surrounding the inner chamber; and
   a first projection extending inwardly from the first wall for engaging a bearing assembly;
   wherein the base portion, the first wall, the second wall, and the first projection are integrally coupled together;
   a third wall extending axially and radially outward from and integrally coupled to the second wall, wherein the third wall is configured to couple to an accelerator.

2. The sump housing of claim 1, further comprising:
   a second projection extending axially outward from and integrally coupled to the second wall, the second projection being positioned inwardly between the third wall and a second wall flange, and wherein the third wall and the second projection collectively define a slot for receiving a wall of the accelerator.

3. The sump housing of claim 2, wherein the third wall defines a plurality of apertures extending therethrough.

4. The sump housing of claim 1, wherein the first wall and the second wall are curved in the axial direction.

5. The sump housing of claim 1, further comprising:
   a fourth wall extending radially outwardly and axially outwardly from the outer base portion, the fourth wall being integrally coupled to the outer base portion.

6. The sump housing of claim 5, further comprising:
   a mounting flange extending radially outwardly from and integrally coupled to the fourth wall, wherein the mounting flange defines one or more mounting apertures extending therethrough.

7. The sump housing of claim 1, further comprising:
   a plurality of tubes extending outwardly from and integrally coupled to the second wall, wherein each of the plurality of tubes is in fluid communication with the inner chamber.

8. The sump housing of claim 7, wherein the inner chamber is configured to contain a lubricant and the outer chamber is configured to contain air.

9. The sump housing of claim 8, wherein one of the plurality of tubes is configured to supply lubricant to the inner chamber and another of the plurality of tubes is configured to scavenge lubricant from inner chamber.

10. A gas turbine engine, wherein the gas turbine engine defines an axial centerline axis around which the sump housing is defined, wherein a radial direction, an axial direction, and a circumferential direction are each defined relative to the axial centerline axis, the gas turbine engine comprising:
    a compressor;
    a combustion section;
    a turbine;
    a shaft drivingly coupling the compressor and the turbine;
    a bearing assembly rotatably supporting the shaft; and
    a sump assembly enclosing the bearing assembly, the sump assembly comprising:
    a main housing comprising an inner base portion and an outer base portion coupled together via a connecting wall, a first wall extending axially outward from the inner base portion, a second wall positioned radially outward from the first wall and extended axially outward and radially inward from the outer base portion, and a first projection extending radially inward from the outer base portion, and wherein the first projection is extended to the first wall that engages the bearing assembly;
    a front housing comprising a front housing projection, a front housing base portion attached to the main housing, and a front housing wall;
    a first seal positioned between the front housing wall and the shaft;
    a second seal positioned between the front housing projection and the shaft;
    a third seal positioned between the first wall of the main housing and the shaft; and
    a fourth seal positioned between the second wall of the main housing and the shaft;
    wherein the base portion of the main housing, the first wall of the main housing, the front housing projection, the shaft, the second seal, and the third seal collectively define an inner chamber within which the bearing assembly is positioned;
    wherein the front housing base portion, the shaft, the first seal, and the second seal collectively define a first outer chamber; and
    wherein the outer base portion of the main housing, the connecting wall of the main housing, the first wall of the main housing, the second wall of the main housing, the shaft, the third seal, and the fourth seal collectively define a second outer chamber; an accelerator; and a third wall extending axially and radially outward from and integrally coupled to the second wall of the main housing, wherein the third wall is coupled to the accelerator.

11. The gas turbine engine of claim 10, wherein the base portion of the main housing, the first wall of the main housing, the second wall of the main housing, and the first projection of the main housing are integrally coupled together.

12. The gas turbine engine of claim 10, further comprising:
a second projection extending axially outward from and integrally coupled to the second wall of the main housing, the second projection being positioned inwardly between the third wall and a second wall flange, and wherein the third wall and the second projection collectively define a slot that receives a wall of the accelerator.

13. The gas turbine engine of claim 10, wherein the first wall of the main housing extends radially inwardly and axially outwardly from the base portion and the second wall of the main housing extends radially inwardly and axially outwardly from the base.

14. The gas turbine engine of claim 10, further comprising:
a fourth wall extending radially and axially outwardly from and integrally coupled to the outer base portion of the main housing, wherein the fourth wall circumferentially encloses at least a portion of the front housing.

15. The gas turbine engine of claim 14, further comprising:
a mounting flange extending radially outwardly from and integrally coupled to the fourth wall, wherein the mounting flange defines one or more mounting apertures extending therethrough for coupling the main housing to a combustor frame in the combustion section.

16. The gas turbine engine of claim 10, further comprising:
a lubricant supply tube extending outwardly from and integrally coupled to the second wall of the main housing; and
a lubricant scavenge tube extending outwardly from and integrally coupled to the second wall of the main housing;
wherein the lubricant supply tube and the lubricant scavenge tube are in fluid communication with the inner chamber.

17. The gas turbine engine of claim 10, wherein the inner chamber contains a lubricant, the first outer chamber contains air, and the second outer chamber contains air.

18. The gas turbine engine of claim 10, wherein the first seal, the second seal, the third seal, and the fourth seal comprise labyrinth seals or hydrodynamic seals.

* * * * *